(12) United States Patent
Durel et al.

(10) Patent No.: US 7,300,970 B2
(45) Date of Patent: *Nov. 27, 2007

(54) TIRE TREAD REINFORCED WITH A SILICA OF LOW SPECIFIC SURFACE AREA

(75) Inventors: Olivier Durel, Clermont-Ferrand (FR); Roland Rauline, Durtol (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 155 days.

This patent is subject to a terminal disclaimer.

(21) Appl. No.: 10/745,649

(22) Filed: Dec. 29, 2003

(65) Prior Publication Data

US 2005/0016651 A1    Jan. 27, 2005

Related U.S. Application Data

(63) Continuation of application No. PCT/EP02/06885, filed on Jun. 21, 2002.

(30) Foreign Application Priority Data

Jun. 28, 2001    (FR) .................................. 01 08784

(51) Int. Cl.
    *C08K 3/34* (2006.01)
(52) U.S. Cl. ..................... 524/493; 524/492; 524/495
(58) Field of Classification Search ................ 524/492, 524/493, 495
    See application file for complete search history.

(56) References Cited

U.S. PATENT DOCUMENTS

| | | | |
|---|---|---|---|
| 3,622,650 A * | 11/1971 | Berstein et al. ............. | 524/493 |
| 3,842,111 A | 10/1974 | Meyer-Simon et al. | |
| 3,873,489 A | 3/1975 | Thurn et al. | |
| 3,978,103 A | 8/1976 | Meyer-Simon et al. | |
| 3,997,581 A | 12/1976 | Pletka et al. | |
| 4,002,594 A | 1/1977 | Fetterman | |
| 4,072,701 A | 2/1978 | Pletka et al. | |
| 4,129,585 A | 12/1978 | Buder et al. | |
| 5,328,949 A * | 7/1994 | Sandstrom et al. ......... | 524/262 |
| 5,580,919 A | 12/1996 | Agostini et al. | |
| 5,583,245 A | 12/1996 | Parker et al. | |
| 5,650,457 A | 7/1997 | Scholl et al. | |
| 5,663,358 A | 9/1997 | Cohen et al. | |
| 5,663,395 A | 9/1997 | Gobel et al. | |
| 5,663,396 A | 9/1997 | Musleve et al. | |
| 5,674,932 A | 10/1997 | Agostini et al. | |
| 5,675,014 A | 10/1997 | Cohen et al. | |
| 5,684,171 A | 11/1997 | Wideman et al. | |
| 5,684,172 A | 11/1997 | Wideman et al. | |
| 5,696,197 A | 12/1997 | Smith et al. | |
| 5,708,053 A | 1/1998 | Jalics et al. | |
| 5,882,617 A | 3/1999 | Chevallier et al. | |
| 5,892,085 A | 4/1999 | Munzenberg et al. | |
| 5,929,156 A | 7/1999 | Fultz et al. | |
| 5,958,127 A | 9/1999 | Bomal et al. | |
| 6,610,261 B1 * | 8/2003 | Custodero et al. .......... | 423/127 |

FOREIGN PATENT DOCUMENTS

| | | |
|---|---|---|
| EP | 0 501 227 | 9/1992 |
| EP | 0 692 492 | 1/1996 |
| EP | 0 692 493 | 1/1996 |
| EP | 0 735 088 | 10/1996 |
| EP | 0 767 206 | 4/1997 |
| EP | 0 786 493 | 7/1997 |
| EP | 0 881 252 | 12/1998 |
| EP | 1 043 357 | 10/2000 |
| FR | 2 149 339 | 3/1973 |
| FR | 2 206 330 | 6/1974 |
| GB | 1 439 247 | 6/1976 |
| WO | WO 99/02590 | 1/1999 |
| WO | WO 99/02601 | 1/1999 |
| WO | WO 99/02602 | 1/1999 |
| WO | WO 99/06480 | 2/1999 |
| WO | WO 99/28376 | 6/1999 |
| WO | WO 00/05300 | 2/2000 |
| WO | WO 00/05301 | 2/2000 |

* cited by examiner

*Primary Examiner*—Edward J. Cain
(74) *Attorney, Agent, or Firm*—Buchanan Ingersoll & Rooney PC

(57) ABSTRACT

A tire tread incorporating an elastomeric composition reinforced by an inorganic filler, based on at least:
   (i) a diene elastomer;
   (ii) as reinforcing inorganic filler, more than 80 phr of a silica of low specific surface area having the following characteristics:
      (a) a BET specific surface area of less than 130 m²/g;
      (b) an average particle size, $d_w$, of between 30 and 300 nm;
   (iii) a coupling agent providing the bond between the reinforcing inorganic filler and the diene elastomer;
   (iv) a vulcanization system comprising sulfur, a vulcanization accelerator and between 0.5 and 1.5 phr of zinc as vulcanization activator.

Preferably, this silica furthermore has a disagglomeration rate α greater than $5 \times 10^3$ μm$^{-1}$/min (measured in the ultrasound disagglomeration test). Compared with a conventional tread for "Green Tires" which is reinforced with a silica of higher specific surface area, the tread of the invention has an improved compromise of (wear resistance/rolling resistance/grip on wet ground) performances. The use of a very small amount of zinc makes it possible to overcome an increase in the induction delays during the vulcanization, when such a silica of low specific surface area is used.

22 Claims, 1 Drawing Sheet

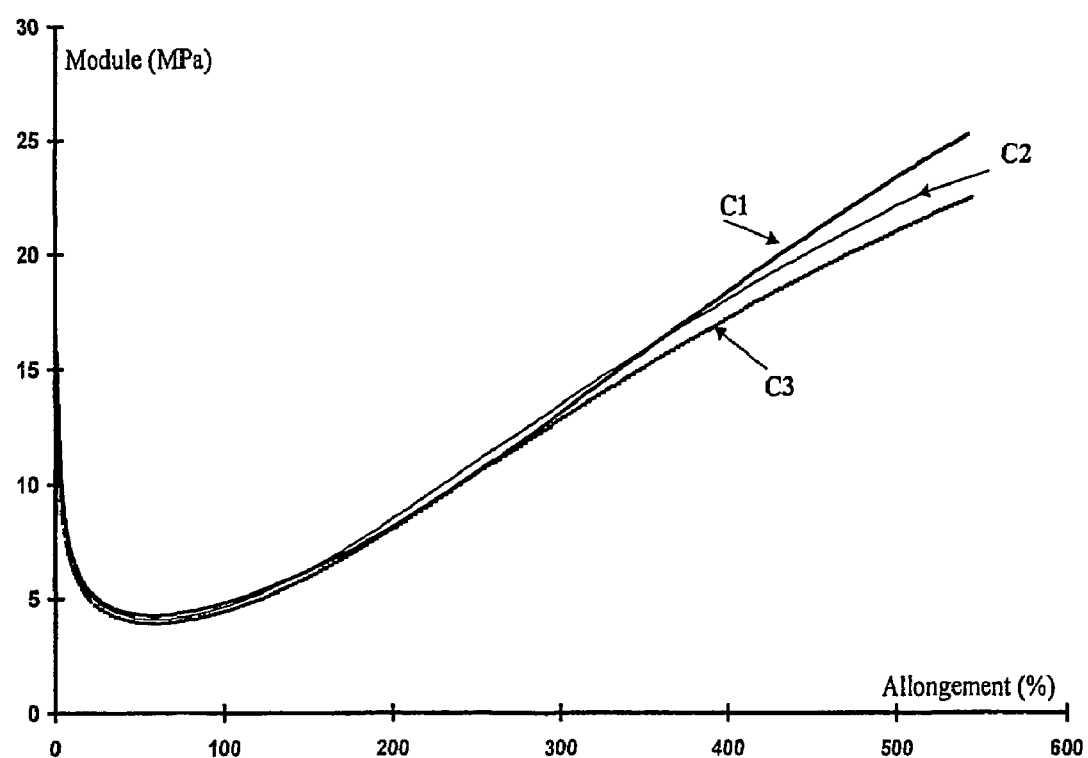

TIRE TREAD REINFORCED WITH A SILICA OF LOW SPECIFIC SURFACE AREA

This application is a continuation of international PCT application Ser. No. PCT/EP02/06885, filed Jun. 21, 2002, which was published in English as WO 03/002648 A1 on Jan. 9, 2003, and which is incorporated by reference.

The present invention relates to tire treads, more particularly to treads reinforced with an inorganic filler, more precisely silica, and to tires comprising such treads.

It is known that tire treads must conform to numerous technical demands, which are frequently contradictory, first and foremost have a high wear or abrasion resistance and excellent grip while imparting to the tire a very good level of road behaviour ("handling") on the automobile, which requires in particular a high drift thrust (or "cornering").

In order to obtain the optimum reinforcement properties imparted by a filler in a tire tread and thus high wear resistance, it is known that this filler should generally be present in the elastomeric matrix in a final form which is both as finely divided as possible and distributed as homogeneously as possible. Now, such conditions can only be obtained insofar as this filler has a very good ability firstly to be incorporated into the matrix during mixing with the elastomer and to be disagglomerated, and secondly to be dispersed homogeneously in this matrix.

It is known that carbon black has such abilities, which is generally not true of inorganic fillers, in particular silicas, because, for reasons of mutual attraction, these inorganic filler particles have an irritating tendency to agglomerate together within the elastomeric matrix. The harmful consequence of these interactions is to limit the dispersion of the filler and hence the reinforcing properties to a substantially lower level than that which it would be theoretically possible to achieve if all the (inorganic filler/elastomer) bonds that could be created during the mixing operation were in fact obtained; these interactions furthermore tend to increase the consistency of the rubber compositions in the uncured state and therefore to make them more difficult to work ("processability") than in the presence of carbon black.

Since fuel economies and the need to protect the environment have become priorities, it has furthermore proved necessary to produce tires having reduced rolling resistance, without adversely affecting their wear resistance.

This has been made possible in particular due to the use, in treads for these tires, of new rubber compositions reinforced with inorganic fillers, in particular silicas, of high dispersibility, which are capable of rivalling a conventional tire-grade carbon black from the reinforcing point of view, while offering these compositions a lower hysteresis, which is synonymous with lower rolling resistance for the tires comprising them, and also improved grip on wet, snow-covered or icy ground.

Treads filled with such highly dispersible silicas, usable in tires having low rolling resistance which are sometimes referred to as "Green Tires" because of the energy saving offered to the user ("Green Tire concept"), have been described in large numbers. Reference will be made in particular to patent applications EP 501 227, EP 692 492, EP 692 493, EP 735 088, EP 767 206, EP 786 493, EP 881 252, WO99/02590, WO99/02601, WO99/02602, WO99/06480, WO00/05300 and WO00/05301.

All these documents of the prior art teach the necessity, in order to obtain a sufficient wear resistance, of using silicas which not only are sufficiently dispersible but also have a high BET specific surface area, of between 100 and 250 $m^2/g$, in fact typically greater than 150 $m^2/g$ (see in particular the aforementioned application EP 501 227). One silica of high specific surface area forming a reference in the field of "Green Tires" is in particular the silica "Zeosil 1165 MP" (BET surface area equal to approximately 160 $m^2/g$) sold by Rhodia (see aforementioned documents).

Although the use of these dispersible silicas of high specific surface area as reinforcing fillers has reduced the difficulties of processing the rubber compositions that contain them, they are still tricky to process, more difficult than for rubber compositions filled conventionally with carbon black.

It is first of all necessary to use a coupling agent, also referred to as bonding agent, the function of which is to provide the connection or bond between the surface of the particles (silanol groups Si—OH) of silica and the elastomer, while facilitating the dispersion of this filler within the elastomeric matrix, the high specific surface area advocated for these silicas being intended precisely to increase the number and quality of the bonds between the silica and the coupling agent, in order to achieve the high level of reinforcement expected.

Such coupling agents are well-known to the person skilled in the art, essentially organosilanes or polyfunctional polysiloxanes. The best known are polysulfurised alkoxysilanes, in particular bis-(alkoxylsilylalkyl) polysulfides such as bis-(alkoxylsilylpropyl) polysulfides, very particularly bis 3-triethoxysilylpropyl tetrasulfide and disulfide (abbreviated to TESPT and TESPD, respectively), which are generally considered as the products providing, for treads filled with silica, the best compromise in terms of resistance to scorching, ease of processing and reinforcing ability. As such, they are the coupling agents which are most used nowadays in "Green Tires".

These polysulfurised alkoxysilanes do however have the known disadvantage that they are very costly and what is more need to be used in a relatively large quantity, typically of the order of 8 to 12% by weight relative to the weight of silica, which is equivalent to amounts of generally between 6 and 10 phr (phr=parts by weight per hundred parts of diene elastomer). In order to reduce these amounts of alkoxysilanes, coupling activators in particular have been proposed (see aforementioned applications WO00/05300 and WO00/05301).

Another factor adversely affecting the processing of the rubber compositions in the uncured state, compared with the use of carbon black, is linked to the strong physical-chemical interactions which are capable of being established between these reinforcing silicas, owing to their large reactive surface, and other ingredients of the rubber compositions, in particular with the vulcanization system. This drawback is the cause of a loss of yield and a reduction in the vulcanization kinetics. In order to counteract these parasitic effects, the amounts of vulcanization agents, in particular accelerators, have had to be increased, other types of accelerators (secondary accelerators) added, relative to the conventional formulations based on carbon black.

In summary, although treads filled with dispersible silicas of high specific surface area have made it possible to achieve a compromise of properties, in terms of rolling resistance, wear resistance and grip, which cannot be obtained with a conventional carbon black for tires, such a result could only be obtained at the cost of more difficult processing and supplementary industrial costs linked in particular to the use of relatively large quantities of coupling agents, in particular polysulfurised alkoxysilanes, and an increase in the amounts of vulcanization agents.

It was admittedly conceivable to overcome, at least in part, some of the above difficulties by reducing to some extent the specific surface area of the silicas, within a range of between 100 and 150 m²/g, for rubber applications which do not demand a very high wear resistance, for example, as far as the treads are concerned, for tires of winter type for which the wear resistance, in known manner, does not constitute a priority performance.

However, silicas of lower specific surface area, upon curing of the treads or tires comprising them, have proved to have another drawback, that of very significantly increasing the delays necessary at the start of the vulcanization reaction (so-called induction delays), in a manner deemed crippling with respect to industrial curing conditions.

Increased curing times are in particular detrimental to treads intended for recapping, be it "cold" recapping (use of a precured tread) or more conventional "hot" recapping (use of a tread in the uncured state); in this latter case, a prolonged curing time, in addition to the fact that it increases the production costs, results in known manner in overcuring (post-curing) of the rest of the casing ("carcass") of the worn tire (already vulcanized), which may adversely affect some performances of the latter.

Now, unexpectedly, during the course of its research, the Applicant discovered that not only the use of silicas of lower specific surface area was not incompatible with obtaining a tread having a high wear resistance, but also that the aforementioned drawback linked to the prolongation of the curing delays could be overcome owing to the use of a substantially reduced quantity of zinc as vulcanization activator.

Consequently, a first subject of the invention relates to a tire tread incorporating an elastomeric composition reinforced with an inorganic filler, based on at least:
  (i) a diene elastomer;
  (ii) as reinforcing inorganic filler, more than 80 phr of a silica having the following characteristics:
    (a) a BET specific surface area of less than 130 m²/g;
    (b) an average particle size, $d_w$, of between 30 and 300 nm;
  (iii) a coupling agent providing the bond between the reinforcing inorganic filler and the diene elastomer;
  (iv) a vulcanization system comprising sulfur, a primary vulcanization accelerator and between 0.5 and 1.5 phr of zinc as vulcanization activator.

One subject of the invention is also the use of a tread according to the invention for the manufacture or the recapping of tires, and also these tires themselves when they comprise a tread according to the invention. The tires of the invention are particularly intended to be fitted on vehicles capable of travelling at a sustained high speed such as passenger vehicles, 4×4 vehicles (having 4 driving wheels), SUVs ("Sport Utility Vehicles"), two-wheeled vehicles (in particular motorcycles), vans, "heavy vehicles" (in particular subway trains, buses and road transport machinery such as lorries, tractors or trailers).

The treads according to the invention are capable of being prepared by a process which constitutes another subject of the present invention. This process for preparing a sulfur-vulcanizable tire tread, having an improved compromise of (wear resistance/rolling resistance/grip) performances, based on diene elastomer, a reinforcing inorganic filler and a vulcanization system, comprises the following steps:
  incorporating in a diene elastomer, during a first step referred to as "non-productive", at least:
    as reinforcing inorganic filler, more than 80 phr of a silica having the following characteristics:
      (a) a BET specific surface area of less than 130 m²/g;
      (b) an average particle size, $d_w$, of between 30 and 300 nm;
    a coupling agent providing the bond between the silica and the diene elastomer;
    as vulcanization activator, between 0.5 and 1.5 phr of zinc,
  thermomechanically kneading the entire mixture, in one or more stages, until a maximum temperature of between 110° C. and 190° C. is reached;
  cooling the entire mixture to a temperature of less than 100° C.;
  then incorporating, during a second step referred to as "productive", sulfur and a vulcanization accelerator;
  kneading the entire mixture until a maximum temperature less than 110° C. is reached;
  calendering or extruding the elastomeric composition thus obtained in the form of a tire tread.

One possible alternative to the above process, also according to the invention, consists of incorporating all or part of the quantity of zinc, not during the non-productive phase but during the productive phase, at the same time as the sulfur and primary accelerator.

BRIEF DESCRIPTION OF THE DRAWINGS

The invention and its advantages will be readily understood in the light of the description and examples of embodiment which follow, and of the single FIGURE relating to these examples, which shows curves of the variation of modulus (in MPa) as a function of the elongation (in %), recorded for rubber compositions intended for tire treads, whether or not in accordance with the invention.

DETAILED DESCRIPTION

I. Measurements and Tests Used

I-1. Characterisation of the Silicas

The silicas described hereafter consist in known manner of agglomerates of particles, which are capable of disagglomerating into these particles under the effect of an external force, for example under the action of mechanical working or ultrasound. The term "particle" used in the present application must be understood in its usual generic sense of "aggregate" (also referred to as "secondary particle"), and not in that of a possible elementary particle (also referred to as "primary particle") which may form, if applicable, part of this aggregate; "aggregate" is to be understood, in known manner, to mean the non-splittable unit (i.e. which cannot be cut or divided) generally formed of elementary (primary) particles which are aggregated together, produced during synthesis of the filler.

These silicas are characterised as indicated hereafter.

A) Specific Surface Area:

The BET specific surface area is determined by adsorption of gas using the method of Brunauer-Emmett-Teller described in "*The Journal of the American Chemical Society*" (Vol. 60, page 309, February 1938), more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17].

The CTAB specific surface area is the external surface area determined in accordance with French Standard NF T 45-007 of November 1987 (method B).

B) Average Particle Size $d_w$:

The average size (by mass) of the particles, $d_w$, is measured conventionally after dispersion, by ultrasound disagglomeration, of the filler to be analysed in water.

Measurement takes place using a centrifugal X-ray detection sedimentometer type "XDC" ("X-rays Disk Centrifuge"), sold by Brookhaven Instruments, in accordance with the following method of operation.

A suspension of 3.2 g of a sample of silica to be analysed in 40 ml of water is produced by action over 8 minutes at 60% power (60% of the maximum position of the "output control") of a 1500-watt ultrasonic probe (Vibracell ¾ inch ultrasound generator sold by Bioblock); after ultrasound generation, 15 ml of the suspension is introduced into the rotating disc; after sedimentation for 120 minutes, the mass distribution of the particle sizes and the average size by mass of the particles $d_w$ are calculated by the software of the "XDC" sedimentometer ($d_w = \Sigma(n_i d_i^5)/\Sigma(n_i d_i^4)$ with $n_i$ being the number of objects of the size class or diameter $d_i$).

c) Disagglomeration Rate α:

The disagglomeration rate α is measured by means of an ultrasound disagglomeration test, at 100% power of a 600 W (watt) probe, operating here in pulse mode (namely: 1 second ON, 1 second OFF) in order to avoid excessive heating of the ultrasonic probe during the measurement. This known test, which is the subject in particular of patent application WO99/28376 (see also WO99/28380, WO00/73372, WO00/73373), makes it possible to measure continuously the change in the average size (by volume) of the agglomerates of particles during ultrasound generation, in accordance with the specifications hereafter.

The setup used is formed of a laser granulometer (type "Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600-watt ½ inch ultrasound generator type Vibracell sold by Bioblock).

A small quantity (150 mg) of silica to be analysed is introduced into the preparer with 160 ml of water, the rate of circulation being set to its maximum. At least three consecutive measurements are taken to determine the initial mean diameter (by volume) of the agglomerates, referred to as dv[0], in accordance with the known Fraunhofer calculation method (Malvern 3$$D calculation matrix). The ultrasound generation (pulse mode: 1 sec ON, 1 sec OFF) is then established at a power of 100% (namely 100% of the maximum position of the "tip amplitude") and the evolution of the mean diameter by volume $d_v[t]$ as a function of the time "t" is monitored for about 8 minutes with one measurement approximately every 10 seconds. After an induction period (about 3-4 minutes), it was noted that the reciprocal of the mean diameter by volume $1/d_v[t]$ varies linearly, or substantially linearly, with the time "t" (stable disagglomeration conditions). The disagglomeration rate α is calculated by linear regression of the curve of evolution of $1/d_v[t]$ as a function of the time "t", within the zone of stable disagglomeration conditions (generally, between about 4 and 8 minutes). It is expressed in $\mu m^{-1}/min$.

The aforementioned application WO99/28376 describes in detail a measuring device usable for performing this ultrasound disagglomeration test. It will be recalled that this device consists of a closed circuit within which a flow of agglomerates of particles suspended in a liquid can circulate. This device essentially comprises a sample preparer, a laser granulometer and a treatment cell. A vent to atmospheric pressure, at the level of the sample preparer and of the treatment cell itself, permits continuous elimination of the air bubbles which form during ultrasound generation (action of the ultrasonic probe).

The sample preparer ("Malvern Small Sample Unit MSX1") is intended to receive the sample of silica to be tested (in suspension in the liquid 3) and to send it through the circuit at the pre-controlled speed (potentiometer—maximum speed of approximately 3 l/min), in the form of a flow of liquid suspension. This preparer consists simply of a receiving tank which contains, and through which circulates, the suspension to be analysed. It is equipped with a stirrer motor of variable speed in order to prevent sedimentation of the agglomerates of particles of the suspension; a centrifugal mini-pump is intended to circulate the suspension in the circuit; the entrance to the preparer is connected to the open air via an opening intended to receive the sample of filler to be tested and/or the liquid used for the suspension.

To the preparer there is connected a laser granulometer ("Mastersizer S"), the role of which is to measure continuously, at regular intervals, the average size by volume "$d_v$" of the agglomerates as the flow passes, by means of a measuring cell to which are coupled the automatic recording and calculation means of the granulometer. It should be recalled here briefly that laser granulometers utilise, in known manner, the principle of diffraction of light by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of light diffracted for different angles of diffraction to be able to determine the size distribution (by volume) of the sample, $d_v$ corresponding to the average size by volume of this distribution ($d_v = \Sigma(n_i d_i^4)/\Sigma(n_i d_i^3)$ with $n_i$ being the number of objects of the size class or diameter $d_i$).

Inserted between the preparer and the laser granulometer there is, finally, a processing cell equipped with an ultrasonic probe, capable of operating in continuous or pulse mode, intended continuously to break up the agglomerates of particles as the flow passes. This flow is thermostatically controlled by means of a cooling circuit arranged, at the level of the cell, in a double casing surrounding the probe, the temperature being controlled, for example, by a heat sensor immersed in the liquid at the level of the preparer.

I-2. Characterisation of the Rubber Compositions

The rubber compositions are characterised, before and after curing, as indicated below.

A) Mooney Plasticity:

An oscillating consistometer such as described in French Standard NF T 43-005 (1991) is used. The Mooney plasticity is measured in accordance with the following principle: the composition in the uncured state (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

B) Scorching Time:

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

C) Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): $t_i$ is the induction delay, that is to say, the time necessary for the start of the vulcanization reaction; $t_\alpha$ (for example $t_{90}$ or $t_{99}$) is the time necessary to achieve a conversion of α%, that is to say α% (for example 90 or 99%, respectively) of the deviation between the minimum and maximum torques. The conversion rate constant K (expressed in $min^{-1}$) of order 1, calculated between 30% and 80% conversion, is also measured, which makes it possible to assess the vulcanization kinetics.

D) Tensile Tests:

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after an accommodation cycle). The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

Processing the tensile data recorded also makes it possible to trace the curve of the modulus as a function of the elongation (see attached FIGURE), the modulus used here being the true secant modulus measured in a first elongation, calculated reduced to the real cross-section of the test piece and not to the initial section as previously for the nominal moduli.

E) Dynamic Properties:

The dynamic properties $\Delta G^*$ and $tan(\delta)_{max}$ are measured on a viscoanalyser (Metravib VA4000), in accordance with Standard ASTM D 5992-96. The response of a sample of vulcanized composition (cylindrical test piece of a thickness of 4 mm and a section of 400 $mm^2$), subjected to an alternating single sinusoidal shearing stress, at a frequency of 10 Hz, under normal conditions of temperature (23° C.) in accordance with Standard ASTM D 1349-99, or at a different temperature, depending on the case, is recorded. Scanning is effected at an amplitude of deformation of 0.1 to 50% (outward cycle), then of 50% to 1% (return cycle). The results used are the complex dynamic shear modulus ($G^*$) and the loss factor $tan(\delta)$. For the return cycle, the maximum value of $tan(\delta)$ which is observed, $tan(\delta)_{max}$, is indicated, as is the deviation in the complex modulus ($\Delta G^*$) between the values at 0.15 and 50% deformation (Payne effect).

F) Shore A Hardness:

The Shore A hardness of the compositions after curing is assessed in accordance with ASTM Standard D 2240-86.

G) "Bound Rubber" Test:

The so-called "bound rubber" test makes it possible to determine the proportion of elastomer, in a non-vulcanized composition, which is associated so intimately with the reinforcing filler that this proportion of elastomer is insoluble in the usual organic solvents. Knowledge of this insoluble proportion of rubber, linked with the reinforcing filler during mixing, gives a quantitative indication of the reinforcing activity of the filler in the rubber composition. Such a method has been described, for example, in French Standard NF T 45-114 (June 1989) applied to the determination of the amount of elastomer bound to the carbon black.

This test, which is well-known to the person skilled in the art for characterising the quality of reinforcement provided by the reinforcing filler, has been described, for example, in the following documents: Plastics, Rubber and Composites Processing and Applications, Vol. 25, No. 7, p. 327 (1996); Rubber Chemistry and Technology, Vol. 69, p. 325 (1996).

In the present case, the amount of elastomer which cannot be extracted with toluene is measured, after swelling for 15 days of a sample of rubber composition (typically 300-350 mg) in this solvent (for example in 80-100 $cm^3$ of toluene), followed by a 24-hour drying step at 100° C., in a vacuum, before weighing the sample of rubber composition thus treated. Preferably, the above swelling step is carried out at ambient temperature (approximately 20° C.) and protected from light, and the solvent (toluene) is changed once, for example after the first five days' swelling.

The amount of "bound rubber" (% by weight), "BR", is calculated in known manner by the difference between the initial weight and the final weight of the sample of rubber composition, after making allowance for in and eliminating from the calculation that fraction of the components which are insoluble by nature, other than the elastomer, which are initially present in the rubber composition.

I-3. Characterisation of the Tires or Treads

A) Rolling Resistance:

The rolling resistance is measured on a test drum, in accordance with method ISO 87-67 (1992). A value greater than that of the control, which is arbitrarily set to 100, indicates an improved result, that is to say a lower rolling resistance.

B) Wear Resistance:

The tires are subjected to actual on-road travel on a given automobile, until the wear due to running reaches the wear indicators located in the grooves of the tread. A value greater than that of the control, arbitrarily set to 100, indicates an improved result, that is to say a greater mileage travelled.

C) Braking on Dry Ground:

The tires are mounted on an automobile fitted with an ABS braking system and the distance necessary to go from 100 km/h to 0 km/h upon sudden braking on dry ground (asphalt concrete) is measured. A value greater than that of the control, which is arbitrarily set to 100, indicates an improved result, that is to say a shorter braking distance.

D) Braking on Damp Ground:

The tires are mounted on an automobile fitted with an ABS braking system and the distance necessary to go from 50 km/h to 10 km/h upon sudden braking on wetted ground (asphalt concrete) is measured. A value greater than that of the control, which is arbitrarily set to 100, indicates an improved result, that is to say a shorter braking distance.

E) Grip on Damp Ground:

To assess the grip performance on damp ground, the behaviour of the tires mounted on a given automobile travelling round a circuit comprising numerous bends and wetted so as to keep the ground damp, under limit speed conditions is analysed.

On one hand, the minimum time necessary to cover the entire circuit is measured; a value greater than that of the control, which is arbitrarily set to 100, indicates an improved result, that is to say a shorter lap time.

The professional driver of the vehicle, on the other hand, assigns a subjective overall mark for road behaviour of the vehicle—and therefore of the tires—on this wetted circuit comprising bends; a mark greater than that of the control, which is arbitrarily set to 100, indicates improved overall behaviour.

F) Drift Thrust:

Each tire tested is mounted on a wheel of suitable dimension and inflated to 2.2 bar. It is made to run at a constant speed of 80 km/h on a suitable automatic machine (machine type "sol-plan" sold by MTS). The load "Z" is varied, at a drift angle of 1 degree, and the drift rigidity or thrust "D" (corrected for the thrust at zero drift) is measured in known manner, by recording the transverse force on the wheel as a function of this load Z using sensors. The drift thrust indicated in the tables is the gradient at the origin of the curve D(Z). An increase in drift thrust is favourable to the road behaviour on dry ground.

II. Conditions of Implementation of the Invention

The tire treads according to the invention are therefore formed, in their entirety or in part, of a rubber composition based on at least:

(ii) a diene elastomer;
(iii) as reinforcing inorganic filler, more than 80 phr of a silica such as described in detail hereafter (having the characteristics a and b);
(iv) a coupling agent providing the bond between the reinforcing inorganic filler and the diene elastomer;
(v) a vulcanization system comprising sulfur, a primary vulcanization accelerator and between 0.5 and 1.5 phr of zinc as vulcanization activator.

Of course, the expression composition "based on" is to be understood to mean a composition comprising the mix and/or the product of reaction in situ of the various constituents used, some of these base constituents being liable to, or intended to, react together, at least in part, during the different phases of manufacture of the treads and tires, in particular during the vulcanization thereof.

II-1. Diene Elastomer

"Diene" elastomer (or rubber) is understood to mean, in known manner, an elastomer resulting at least in part (i.e. a homopolymer or a copolymer) from diene monomers, that is to say, monomers bearing two carbon-carbon double bonds, whether conjugated or not. "Essentially unsaturated" diene elastomer is understood here to mean a diene elastomer resulting at least in part from conjugated diene monomers, having a content of members or units of diene origin (conjugated dienes) which is greater than 15% (mol %). Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, the person skilled in the art of tires will understand that the present invention is used first and foremost with highly unsaturated diene elastomers, in particular with:

(a)—any homopolymer obtained by polymerisation of a conjugated diene monomer having 4 to 12 carbon atoms;
(b)—any copolymer obtained by copolymerisation of one or more conjugated dienes with each other or with one or more vinyl-aromatic compounds having 8 to 20 carbon atoms.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert, butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in dispersion or in solution; they may be coupled and/or starred or alternatively functionalised with a coupling and/or starring or functionalising agent.

The diene elastomer of the tread according to the invention is preferably constituted, in its entirety or in part, more preferably to at least 50 phr, by a highly unsaturated elastomer of the butadiene type, that is to say selected from the group of the highly unsaturated diene elastomers constituted by polybutadienes (BR), butadiene copolymers and mixtures of these elastomers. These butadiene copolymers are in particular butadiene-styrene copolymers (SBR), isoprene-butadiene copolymers (BIR) or isoprene-butadiene-styrene copolymers (SBIR).

Suitable preferred butadiene elastomers are in particular BRs having a content of 1,2-units of between 4% and 80% or those having a content of cis-1,4 greater than 80%, SBRs having a styrene content of between 5% and 50% by weight and more particularly between 20% and 40%, a content of −1,2 bonds of the butadiene fraction of between 4% and 65%, a content of trans-1,4 bonds of between 20% and 80%, BIRs having an isoprene content of between 5% and 90% by weight and a glass transition temperature ("$T_g$" measured in accordance with ASTM Standard D3418-82) of 40° C. to −80° C. In the case of SBIR copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any SBIR having a Tg of between −20° C. and −70° C.

The butadiene elastomer is particularly selected from among the BRs, the SBRs and mixtures of these elastomers.

Preferably, in the case of a tread for a tire for passenger vehicles, the butadiene elastomer is majoritarily an SBR elastomer, be it an SBR prepared in emulsion ("ESBR") or an SBR prepared in solution ("SSBR"), or a mixture of SBR and another diene elastomer, in particular a butadiene elastomer, for example of a blend of SBR and BR, of SBR and NR (natural rubber), or of SBR and IR (synthetic polyisoprene).

In particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used. Such an SBR copolymer, preferably an SSBR, is possibly used in a mixture with BR having preferably more than 90% cis-1,4 bonds.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

II-2. Reinforcing Inorganic Filler ("LS" Silica)

The tread according to the invention has the essential characteristic of being reinforced, as inorganic filler, by more than 80 phr of a specific silica having the following characteristics:

(a) a BET specific surface area of less than 130 m$^2$/g;
(b) an average particle size, $d_w$, of between 30 and 300 nm.

This specific silica, referred to as "LS" for "Low Surface", first of all has a BET surface area which is unusual for a tire tread application. For a BET value greater than 130 m$^2$/g, in particular greater than 150 m$^2$/g, there is the drawback of conventional silicas of high specific surface area for treads of "Green Tires", namely on one hand reduced dispersibility in the rubber matrix and processing difficulties in the uncured state, owing in particular to parasitic interactions with other ingredients (for example the vulcanization system) of the rubber compositions, and on the other hand the necessity of using a greater amount of coupling agent.

The person skilled in the art will be able to define, for these LS silicas, the lower BET limit usable, in the light of the present description, as a function in particular of the particular application which is desired. Preferably, the LS silicas have a BET surface area of not less than 50 m$^2$/g. For a value of less than 50 m$^2$/g, although the rubber compositions have easier working and a reduced hysteresis, there is the risk of a decline in the properties at break, with wear resistance in the tread which can diminish in crippling manner. For all these reasons, in particular in the case of a passenger-car tire tread, it is preferred that the BET surface area be greater than 70 m$^2$/g, more preferably still within a range from 100 to 125 m$^2$/g.

The LS silicas must on the other hand have a size $d_w$ of between 30 and 300 nm. For excessively large sizes $d_w$, greater than 300 nm, the particles act like defects which localise stresses and are harmful in terms of wear; sizes $d_w$ which are too small, less than 30 nm, on the other hand, adversely affect processing in the uncured state and the dispersion of the silica during this processing.

Finally, for applications in which the highest level of reinforcement is required, the LS silicas used will furthermore, preferably, have a high intrinsic dispersibility, illustrated by a disagglomeration rate α (measured in the ultrasound disagglomeration test described in section I above) greater than $5 \times 10^{-3}$ μm$^{-1}$/min. For such a disagglomeration rate, it has been noted that the LS silica had a very high dispersibility, that is to say that few micronic agglomerates are observed by optical microscopy reflection on a section of rubber composition prepared in accordance with the rules of the art.

For the various reasons indicated above, the LS silicas selected preferably satisfy at least one of the following characteristics:

a BET surface area of between 70 and 130 m$^2$/g;
a particle size $d_w$ of between 50 and 200 nm;
a disagglomeration rate α greater than $5 \times 1^{-3}$ μm$^{-1}$/min.

More preferably still, at least one of the following characteristics is satisfied:

a BET surface area within a range from 100 to 125 m$^2$/g;
a particle size $d_w$ within a range from 100 to 150 nm;
a disagglomeration rate α greater than $1 \times 10^{-2}$ μm$^{-1}$/min.

The physical state in which the LS silica may be present is immaterial, whether it be in the form of a powder, microbeads, granules, pellets, balls or any other densified form; it may be a precipitated silica or a pyrolysed silica. Its ratio of BET/CTAB surface area preferably lies within a range from 1.0 to 1.5, more preferably from 1.0 to 1.2.

The LS silicas may advantageously constitute the entire reinforcing inorganic filler, which constitutes the best known embodiment of the invention.

However, another reinforcing inorganic filler could possibly be associated with the LS silica, for example a small amount of a conventional reinforcing silica having a higher specific surface area. "Reinforcing inorganic filler" is to be understood here to mean any inorganic or mineral filler, whatever its colour and its origin (natural or synthetic), also referred to as "white" filler or sometimes "clear" filler in contrast to carbon black, capable, on its own, without any other means than an intermediate coupling agent, of reinforcing a rubber composition intended for the manufacture of a tire tread, in other words which is capable of replacing a conventional tire-grade carbon black (for treads) in its reinforcement function. As filler equivalent to such a reinforcing inorganic filler, there could be used a reinforcing filler of organic type, in particular a carbon black, covered at least in part with an inorganic layer (for example, a layer of silica), which for its part requires the use of a coupling agent to provide the connection to the elastomer.

With the LS silica there may be also associated a conventional tire-grade carbon black, selected in particular from among the blacks of the type HAF, ISAF, SAF which are conventionally used in treads for tires (for example, blacks N115, N134, N234, N330, N339, N347, N375). This carbon black is then preferably used in a small proportion, in an amount of preferably between 2 and 20 phr, more preferably within a range from 5 to 15 phr. Within the ranges indicated, there is a benefit to be had from the colouring properties (black pigmentation agent) and anti-UV properties of the carbon blacks, without furthermore adversely affecting the typical performance provided by the LS silica.

Preferably, the amount of LS silica is greater than 90 phr, more preferably of between 90 and 150 phr, the optimum of course being different according to the type of tire desired.

Finally, the amount of LS silica preferably represents more than 80%, more preferably more than 90%, by weight of the total reinforcing [filler] (total inorganic filler plus carbon black, if applicable).

II-3. Coupling Agent

It will be recalled here that (inorganic filler/elastomer) "coupling agent" is to be understood to mean, in known manner, an agent capable of establishing a sufficient chemical and/or physical bond between the inorganic filler and the diene elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

T represents a divalent organic group making it possible to link Y and X.

It will be recalled that the coupling agents must not be confused with simple agents for covering the inorganic filler which, in known manner, may comprise the "Y" function which is active with respect to the inorganic filler but are devoid of the "X" function which is active with respect to the diene elastomer.

(Silica/diene elastomer) coupling agents, of variable effectiveness, have been described in a very large number of documents and are well-known to the person skilled in the art. Any known coupling agent likely to ensure, in the diene rubber compositions usable for the manufacture of tire treads, the effective bonding between a reinforcing inorganic filler such as silica and a diene elastomer, in particular organosilanes or polyfunctional polyorganosiloxanes bearing the functions X and Y mentioned above, may be used.

In particular polysulfurised silanes, which are referred to as "symmetrical" or "asymmetrical" depending on their specific structure, are used, such as those described for example in the patents or patent applications FR 2 149 339, FR 2 206 330, U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085 or EP 1 043 357.

Particularly suitable for implementing the invention, without the definition below being limitative, are symmetrical polysulfurised silanes which satisfy the following general formula:

Z-A-S$_n$-A-Z, in which: (I):

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

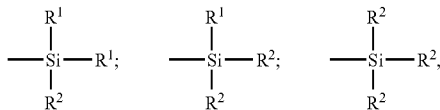

in which:

the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl).

the radicals $R^2$, which may or may not be substituted, and may be identical or different, represent a hydroxyl group, a $C_1$-$C_{18}$ alkoxyl group or a $C_5$-$C_{18}$ cycloalkoxyl group (preferably a group selected from among hydroxyl, $C_1$-$C_8$ alkoxyls and $C_5$-$C_8$ cycloalkoxyls, more preferably still a group selected from among hydroxyl and $C_1$-$C_4$ alkoxyls, in particular methoxyl and ethoxyl).

In the case of a mixture of polysulfurised silanes of the formula (I) above, in particular the conventional mixtures available commercially, it will be understood that the average value of the "n"s is a fractional number, preferably within a range from 2 to 5.

As examples of polysulfurised silanes, mention will be made more particularly of the polysulfides (in particular disulfides, trisulfides or tetrasulfides) of bis-(($C_1$-$C_4$) alkoxyl-($C_1$-$C_4$)alkylsilyl-($C_1$-$C_4$)alkyl), such as for example bis(3-trimethoxysilylpropyl) or bis(3-triethoxysilylpropyl) polysulfides. Of these compounds, bis(3-triethoxysilylpropyl) tetrasulfide, abbreviated TESPT, of the formula [($C_2H_5O$)$_3$Si($CH_2$)$_3S_2$]$_2$ or bis(triethoxysilylpropyl) disulfide, abbreviated TESPD, of the formula [($C_2H_5O$)$_3$Si($CH_2$)$_3$S]$_2$, are used in particular.

TESPD is sold, for example, by Degussa under the name Si75 (in the form of a mixture of disulfide—75% by weight—and of polysulfides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulfides having an average value of n which is close to 4).

The person skilled in the art will be able to adjust the content of coupling agent in the compositions of the invention, according to the intended application, the nature of the elastomer used, and the quantity of LS silica, supplemented if applicable by any other inorganic filler used as supplementary reinforcing filler.

It has proved that the use of an LS silica, in the treads according to the invention, makes it possible substantially to reduce the amount of coupling agent, in particular of polysulfurised silane, relative to the conventional amounts used in the presence of a conventional silica having a higher specific surface area. Thus, in these treads of the invention, the amount of coupling agent, in particular of polysulfurised silane, is preferably less than 6 phr, more preferably between 2 and 6 phr. Reduced to the weight of reinforcing inorganic filler, in particular of LS silica when the latter constitutes the entire reinforcing inorganic filler, this amount of coupling agent is advantageously less than 8%, more preferably less than 6% by weight relative to the weight of reinforcing inorganic filler.

The coupling agent used could be grafted beforehand (via the "X" function) on to the diene elastomer of the composition of the invention, the elastomer thus functionalised or "precoupled" then comprising the free "Y" function for the reinforcing inorganic filler. The coupling agent could also be grafted beforehand (via the "Y" function) on to the reinforcing inorganic filler, the filler thus "precoupled" then being able to be bonded to the diene elastomer by means of the free "X" functions. However, it is preferred to use the coupling agent in the free (i.e. non-grafted) state or grafted on to the reinforcing inorganic filler, in particular on the LS silica, notably for reasons of better processing of the compositions in the uncured state.

Finally, there may possibly be associated with the coupling agent an appropriate "coupling activator", that is to say, a body (single compound or association of compounds) which, when mixed with this coupling agent, increases the effectiveness of the latter (see, for example, aforementioned applications WO00/5300 and WO00/5301).

II-4. Vulcanization System

According to the invention, the base vulcanization system is constituted of sulfur and a primary vulcanization accelerator, preferably a sulfenamide accelerator. To this base vulcanization system there are added, incorporated during the first, non-productive phase and/or during the productive phase, various known secondary accelerators or vulcanization activators.

A very small quantity of zinc, of between 0.50 and 1.5 phr, more preferably within a range from 0.7 to 1.3 phr, is used as vulcanization activator.

This specific quantity of zinc may be supplied to the rubber composition in any manner known to the person skilled in the art, preferably in the form of zinc oxide, in this case consequently used in an equivalent preferred amount of between 0.6 and 1.9 phr, more preferably within a range from 0.9 to 1.6 phr.

Preferably a fatty acid, more preferably stearic acid, present in a preferred amount of 0.5 to 3 phr, more preferably of 1 to 3 phr, is associated with this zinc oxide.

All or part of the zinc used may also be incorporated in the treads and their compositions in the form of a fatty acid zinc salt, in particular in the form of zinc stearate, or alternatively another zinc donor compound which is active with respect to the vulcanization.

The primary vulcanization accelerator is preferably an accelerator of the sulfenamide type. The use of the LS silica makes it possible substantially to reduce the overall amount of sulfur and sulfenamide accelerator to a preferred value of between 1.25 and 2.75 phr, more preferably within a range from 1.5 to 2.5 phr, the sulfur and sulfenamide accelerator furthermore each being used, even more preferably, in an amount of between 0.5 and 1.5 phr.

Preferably a guanidine derivative, in particular diphenylguanidine (DPG), incorporated during the first, non-productive phase (preferred embodiment of the invention) and/or during the productive phase, is used as secondary vulcanization accelerator. This guanidine derivative furthermore advantageously acts as a covering agent for the LS silica. The use of LS silica here again makes it possible advantageously to reduce the overall amount of sulfur, sulfenamide and guanidine derivative to a preferred value within a range from 1.75 to 4.25 phr, more preferably within a range from 2 to 4 phr.

II-5. Various Additives

Of course, the elastomeric compositions of the treads according to the invention also comprise all or part of the conventional additives used in rubber compositions intended for the manufacture of tire treads, such as, for example, extender oils, plasticisers, protective agents such as anti-ozone waxes, chemical antiozonants, antioxidants, anti-fatigue agents, coupling activators, reinforcing resins or methylene acceptors and/or donors. There may also be associated with the LS silica, if necessary, a conventional poorly reinforcing or non-reinforcing white filler, such as particles of clay, bentonite, talc, chalk, kaolin, which are usable for example in coloured tire treads.

The elastomeric compositions may also contain, in addition to the coupling agents previously described, covering agents for inorganic fillers, comprising for example the single Y function, or more generally processing aids liable, in known manner, owing to an improvement in the dispersion of the reinforcing inorganic filler in the rubber matrix and to a reduction in the viscosity of the compositions, to improve their ability to be worked in the uncured state; these agents, used in a preferred amount of between 0.5 and 3 phr, are, for example, alkylalkoxysilanes, in particular alkyltriethoxysilanes, such as 1-octyl-triethoxysilane sold by Degussa-Huils under the name Dynasylan Octeo or 1-hexadecyl-triethoxysilane sold by Degussa-Huils under the name Si216, polyols, polyethers, (for example polyethylene glycols), primary, secondary or tertiary amines (for example trialkanolamines), hydroxylated or hydrolysable polyorganosiloxanes, for example $\alpha\omega$-dihydroxy-polyorganosiloxanes (in particular $\alpha,\omega$-dihydroxy-polydimethylsiloxanes).

II-6. Preparation of the Compositions and Treads

The elastomeric compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 40° C. and 100° C., during which finishing phase the base vulcanization system is incorporated; such phases have been described for example in the aforementioned applications EP 501 227, EP 735 088, WO00/05300 or WO00/05301.

The process for manufacturing the compositions according to the invention is characterised in that at least the LS silica (whether or not associated with another reinforcing inorganic filler or a carbon black) and the coupling agent are intimately incorporated by kneading into the diene elastomer during the first, so-called non-productive, phase, that is to say that at least these different base constituents are introduced into the mixer and are kneaded thermomechanically, in one or more steps, until a maximum temperature of between 110° C. and 190° C., preferably between 130° C. and 180° C., is reached.

By way of example, the first (non-productive) phase is effected in a single thermomechanical step during which in a first phase all the base constituents necessary (diene elastomer, reinforcing inorganic filler and coupling agent), then in a second phase, for example after one to two minutes' kneading, any complementary covering agents or processing agents and other various additives, with the exception of the base vulcanization system constituted by sulfur and primary vulcanization accelerator, are introduced into a suitable mixer, such as a conventional internal mixer; as the apparent density of the LS silica is generally low, it may be advantageous to divide the introduction thereof into two or more parts.

A second (or even several) step(s) of thermomechanical working may be added to this internal mixer, after the mixture has dropped and after intermediate cooling (cooling temperature preferably less than 100° C.), with the aim of making the compositions undergo complementary thermomechanical treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling the mixture thus obtained, the sulfur and primary accelerator, preferably sulfenamide, are then incorporated at low temperature, generally in an external mixer such as an open mill; the entire mixture is then mixed (productive phase) for several minutes, for example between 5 and 15 minutes.

The final composition thus obtained is then calendered, for example in the form of thin slabs (thickness of 2 to 3 mm) or thin sheets of rubber in order to measure its physical or mechanical properties, in particular for laboratory characterisation, or alternatively extruded to form rubber profiled elements used directly, after cutting out or assembly to the dimensions desired, as treads for tires.

In summary, the process for preparing a tire tread according to the invention comprises the following steps:
incorporating in a diene elastomer, during a first phase referred to as "non-productive":
as reinforcing inorganic filler, more than 80 phr of an LS silica having the following characteristics:
(a) a BET specific surface area of less than 130 m$^2$/g;
(b) an average particle size $d_w$ of between 30 and 300 nm;
a coupling agent providing the bond between the silica and the diene elastomer;
as vulcanization activator, between 0.5 and 1.5 phr of zinc,
thermomechanically kneading the entire mixture, in one or more stages, until a maximum temperature of between 110° C. and 190° C. is reached;
cooling the entire mixture to a temperature of less than 100° C.;
then incorporating, during a second phase referred to as "productive", sulfur and a primary vulcanization accelerator;
kneading the entire mixture until a maximum temperature less than 110° C. is reached;
calendering or extruding the elastomeric composition thus obtained in the form of a tire tread.

One possible alternative to the above process, also according to the invention, consists of incorporating all or part of the quantity of zinc, not during the first, non-productive, phase but during the second, productive, phase, at the same time as the sulfur and primary accelerator.

The vulcanization or curing of the tread or of the tire is carried out in known manner at a temperature preferably of between 130° C. and 200° C., preferably under pressure, for a sufficient time which may vary for example between 5 and 90 min as a function in particular of the curing temperature, the vulcanization 'system adopted, the vulcanization kinetics of the composition in question and the size of the tire.

The rubber compositions previously described, based on LS silica, generally constitute the entire tread according to the invention. However, the invention also applies to those cases in which these rubber compositions form only part of a composite-type tread, formed for example of different transversely adjacent treads, or alternatively of two radially superposed layers of different constitutions, the part filled with LS silica possibly constituting for example, in the second case, the radially outer layer of the tread intended to come into contact with the ground from the start of running of the new tire, or on the contrary its radially inner layer intended to come into contact with the ground at a later date.

It goes without saying that the present invention relates to the treads and tires previously described, both in the "uncured" state (i.e. before curing) and in the "cured" or vulcanized state (i.e. after vulcanization).

III. EXAMPLES OF EMBODIMENT OF THE INVENTION

III-1. Fillers Used

The characteristics of the fillers used in the following examples are set forth in Table 1. The filler A is a conventional reinforcing silica of high specific surface area (BET approximately 160 m$^2$/g), reference inorganic filler for the reinforcement of the treads of "Green Tires" ("Zeosil 1165 MP" from Rhodia); filler B is the LS silica of lower specific surface area. Both are precipitated silicas, being in the form of microbeads; their BET/CTAB ratio is close to 1.

The characteristics of BET surface area and size $d_w$ however distinctly differentiate the two fillers, filler B having a surface area per unit of mass which is very substantially reduced (108 instead of 160 m$^2$/g) and a particle size $d_w$ which is greater by nearly 50% (125 nm instead of 85 nm). The two silicas are both furthermore characterised by a high intrinsic dispersibility, illustrated by a very high disagglomeration rate α, of the order of $1.25 \times 10^2$ μm$^{-1}$/min.

It will be noted that the LS silica satisfies all the following preferred characteristics:
a BET surface area within a range from 100 to 125 m$^2$/g;
a particle size $d_w$ within a range from 100 to 150 nm;
a disagglomeration rate α greater than $1 \times 1^{-2}$ μm$^{-1}$/min.

III-2. Preparation of the Compositions

For the following tests, the procedure is as follows: the diene elastomer (or the mixture of diene elastomers, if applicable), the reinforcing filler, the coupling agent, then, after one to two minutes' kneading, the various other ingredients, with the exception of the sulfur and the sulfenamide primary accelerator, are introduced into an internal mixer filled to 70%, the initial tank temperature of which is approximately 60° C. Thermomechanical working (non-productive phase) is then performed in one or two steps (total duration of kneading equal to about 7 minutes), until a maximum "dropping" temperature of about 160-165° C. is reached.

The mixture thus obtained is recovered, it is cooled and then the sulfur and sulfenamide accelerator are added on an external mixer (homo-finisher) at 30° C., by mixing everything (productive phase) for 3 to 4 minutes.

The compositions are then either calendered in the form of plates (thickness of 2 to 3 mm) in order to measure their physical or mechanical properties, or extruded directly in the form of tire treads.

In the tests which follow, the silica used advantageously constitutes the entire reinforcing inorganic filler, associated with a small amount of carbon black (less than 10 phr).

III-3. Tests

A) Test 1

The aim of this test is to demonstrate the overall improved performances of an elastomeric composition based on LS silica, compared with a control composition using a conventional silica (high specific surface area) for a tread for a "Green Tire".

For this, three butadiene rubber compositions (SBR/BR blend) intended for the manufacture of treads for passenger-car tires are compared:

composition C-1 (control): silica A (80 phr) with conventional amount of ZnO (2.5 phr);
composition C-2 (control): silica B (94 phr) with conventional amount of ZnO (2.5 phr);
composition C-3 (invention): silica B (94 phr) with conventional amount of ZnO (1.25 phr).

Tables 2 and 3 show in succession the formulation of the different compositions (Table 2—amount of the different products expressed in phr), and their properties before and after curing at 150° C. for 40 minutes (Table 3). The attached FIGURE shows the curves of modulus (in MPa) as a function of the elongation (in %); these curves are marked C1 to C3, and correspond to compositions C-1 to C-3 respectively.

The butadiene elastomer is constituted of an SSBR comprising 25% of styrene, 58% of 1-2 polybutadiene units, and 23% of trans 1-4 polybutadiene, with which there is associated a BR having more than 90% cis-1,4 bonds. The amount of total reinforcing filler, constituted by the LS silica and a small quantity of carbon black (less than 10 phr), is greater than 100 phr in the composition according to the invention.

Composition C-3 intended for the tread according to the invention is characterised on one hand by a very high amount of LS silica (increased by close to 20% compared with the control composition C-1), and on the other hand by a distinctly reduced amount of ZnO (reduced by half compared with the control compositions C-1 and C-2).

Composition C-3, compared with the reference solution C-1, furthermore has the following advantageous characteristics:

less than 6 phr of polysulfurised alkoxysilane (TESPT);
an amount by weight of this same coupling agent, relative to the weight of silica, which is distinctly reduced (less than 6% compared with 8%);
an overall amount of sulfur and sulfenamide accelerator which is also substantially reduced (2.5 phr instead of 3 phr), just like the overall amount of sulfur, sulfenamide accelerator and guanidine derivative (3.95 phr instead of 4.5 phr).

Compared with the control composition C-1, the compositions based on LS silica exhibit first of all (see Table 3):

a viscosity in the uncured state which is admittedly equivalent but distinctly lower than that which would be observed for the control composition at an equal amount (94 phr) of conventional silica of high specific surface area (in this latter case, more than 120 MU for the control solution C-1), which illustrates an excellent processing ability in the uncured state;
an equivalent amount of "bound rubber" (BR), which already indicates a very good bond between the LS silica and the coupling agent;
reinforcement properties after curing which, unexpectedly, are at least equal to those of the control solution: Shore hardness equivalent, moduli at high deformation (ME100, ME300) and ratio ME300/ME100 at least as high, both clear indicators of a high quality of the reinforcement provided by the LS silica,
the appended FIGURE clearly confirming the above results with, for elongations of 100% to 300%, an equivalent modulus for the three types of compositions; equivalent hysteresis properties ($\Delta G^*$ and $\tan(\delta)_{max}$).

One particular comment relates to the rheometric properties.

It will be noted that for the control composition C-2, comprising the same amount of ZnO (2.5 phr) as the control composition C-1, these rheometric properties are distinctly degraded compared with the control solution: the replacement of the conventional silica of high specific surface area with the LS silica results in an increase of 30% in the induction delay $t_i$, an increase of 60% in the time T5, the curing kinetics (K) being furthermore identical. Such increases are deemed crippling with respect to the industrial curing conditions of a tire tread.

Now, unexpectedly, the above problem is solved by a very substantial reduction in the vulcanization activator ZnO (1.25 phr) in the solution according to the invention, $t_i$ and T5 even being reduced, while retaining values which are acceptable from the industrial point of view, relative to the reference (composition C-1).

Such results must now face real running tests on the treads, as set forth in Test 2 which follows.

B) Test 2

The above compositions C-1 and C-3 are used in this test as treads for passenger-car tires having a radial carcass, of dimension 195/65 R15 (speed index H), which are conventionally manufactured and identical in all points except for the rubber composition constituting the tread: composition C-1 for the control "Green Tires" (P-1), composition C-3 for the tires of the invention (P-3).

The tires were first of all tested on a machine to determine their rolling resistance and their drift thrust, then mounted on a vehicle for the rest of the tests.

All the running results are summarised in Table 4.

It will be noted first of all that the rolling resistance performance of the two types of tire is equivalent, if not improved for the invention (+1%), which is synonymous of a low fuel consumption for a vehicle fitted with tires according to the invention.

The tires are then subjected to on-road travel on a passenger car of the marque Peugeot 406, in order to determine the wear resistance. In known manner, the wear resistance of the tread, during the travel of the tire, is directly correlated to the level of reinforcement provided by the reinforcing inorganic filler and its associated coupling agent. In other words, the measurement of the wear resistance is an excellent indicator, if not the best since it is evaluated on the final manufactured product, of the overall performance of the silica used.

It will then be noted that the tires according to the invention exhibit a performance identical to that of the control tire, which already constitutes a remarkable and unexpected result for the person skilled in the art: a reinforcing silica of lower specific surface area, provided that it is used in a very high amount in the tread, may therefore result in a (rolling resistance/wear resistance) compromise equivalent to that which was believed hitherto to be available only with silicas of higher specific surface area, typically greater than 150 ml/g.

It will furthermore be noted that the drift thrust, which is indicative to the person skilled in the art of the road behaviour on dry ground, is itself also kept at the same level.

The tires are finally mounted on another passenger vehicle (marque Renault Laguna—rated pressure at the front and rear) to be subjected to the braking and grip tests described in section I-3, in accordance with the following particular conditions:

- braking (on dry or damp ground): the tires to be tested are mounted at the front of the vehicle;
- travel on a damp circuit comprising bends: the tires to be tested are mounted at the front and at the rear of the vehicle.

The tires P-3 then exhibit a significant gain (plus 6%) as far as the braking on wet ground is concerned. This first result is confirmed by the running test on a damp circuit comprising bends clearly showing that the use of LS silica results in a significant improvement in grip, which is illustrated both by a reduction in the minimum time necessary to cover the circuit under limit speed conditions (lap time reduced by 1.5 s per lap) and by the evolution in the behaviour mark attributed by the driver (increase of 10%), these two variations being very significant for such a test.

To summarise, the tires P-3 of the invention therefore exhibit a (rolling resistance/wear resistance/grip/behaviour) compromise which is improved overall compared with the reference formed by the control "Green Tires" P-1.

Compared with silicas of higher specific surface area, the LS silicas previously described, owing to their reduced specific surface area, have numerous advantages:

- fewer parasitic interactions, on one hand between the particles of silica themselves (reduced risks of re-agglomeration in the rubber matrix), and on the other hand between the particles of silica and the other rubber additives;
- overall improvement in the dispersibility in the diene matrix, during the kneading operations, that is to say the processing of the compositions in the uncured state;
- possible reduction in the amounts of coupling agent and of vulcanization agents, in particular of sulfur and sulfenamide accelerator, which results in a reduction in the costs of the formulation.

Finally, the use of a very small quantity of zinc, a necessary characteristic for overcoming the problem of prolongation of the induction delays during the curing of the treads, contributes at the same time to the overall reduction in the industrial costs of these treads.

TABLE 1

| $SiO_2$ filler: | A | B |
| --- | --- | --- |
| BET surface area ($m^2/g$) | 160 | 108 |
| $d_w$ (nm) | 85 | 125 |

(A) silica "Zeosil 1165 MP" from Rhodia (CTAB = 158 $m^2/g$);
(B) silica "Zeosil 1115 MP" from Rhodia (CTAB = 107.5 $m^2/g$).

TABLE 2

| Composition No. | C-1 | C-2 | C-3 |
| --- | --- | --- | --- |
| SBR (1) | 88.5 | 88.5 | 88.5 |
| BR (2) | 25 | 25 | 25 |
| silica A | 80 | — | — |
| silica B | — | 94 | 94 |
| carbon black (3) | 6.4 | 6.4 | 6.4 |
| aromatic oil (4) | 19 | 19 | 19 |
| TESPT (5) | 6.4 | 5.5 | 5.5 |
| DPG (6) | 1.5 | 1.35 | 1.35 |
| Zn (ZnO) (7) | 2.0 (2.5) | 2.0 (2.5) | 1.0 (1.25) |
| stearic acid | 2 | 2 | 2 |

TABLE 2-continued

| Composition No. | C-1 | C-2 | C-3 |
| --- | --- | --- | --- |
| paraffin (8) | 1.5 | 1.5 | 1.5 |
| antioxidant (9) | 2.0 | 2.0 | 2.0 |
| sulfur | 1 | 1.25 | 1.25 |
| accelerator (10) | 2 | 1.25 | 1.25 |

(1) SSBR with 59.5% of 1-2 polybutadiene units; 26.5% of styrene; Tg = -29° C.; 75 phr dry SBR extended with 18% by weight of aromatic oil (namely a total of SSBR + oil equal to 88.5 phr);
(2) BR with 4.3% of 1-2; 2.7% of trans; 93% of cis 1-4 (Tg = -106° C.);
(3) carbon black N234;
(4) aromatic oil in free form ("Enerflex 65" from BP);
(5) TESPT ("Si69" from Degussa);
(6) diphenylguanidine ("Vulcacit D" from Bayer);
(7) zinc in the form of zinc oxide (rubber grade);
(8) mixture of macro-and microcrystalline anti-ozone waxes;
(9) N-1,3-dimethylbutyl-N-phenyl-para-phenylenediamine ("Santoflex 6-PPD" from Flexsys);
(10) N-cyclohexyl-2-benzothiazyl sulfenamide (from Flexsys: "Santocure" CBS").

TABLE 3

| | Composition No. | | |
| --- | --- | --- | --- |
| | C-1 | C-2 | C-3 |
| Properties before curing: | | | |
| Mooney (MU) | 98 | 95 | 97 |
| BR (%) | 47 | 45.2 | 48 |
| $t_i$ (min) | 7.9 | 10.2 | 6.6 |
| T5 (min) | 16 | 26 | 13 |
| K ($min^{-1}$) | 0.138 | 0.133 | 0.135 |
| Properties after curing: | | | |
| Shore hardness | 69.1 | 68.9 | 69.3 |
| ME10 (MPa) | 6.03 | 5.89 | 6.04 |
| ME100 (MPa) | 1.98 | 1.92 | 1.94 |
| ME300 (MPa) | 2.18 | 2.27 | 2.31 |
| ME300/ME100 | 1.10 | 1.18 | 1.19 |
| $\Delta G^*$ (40° C.) | 5.4 | 5.5 | 5.3 |
| tan $(\delta)_{max}$ (40° C.) | 0.297 | 0.306 | 0.303 |
| breaking stress (MPa) | 20.5 | 19.1 | 19.5 |
| elongation at break (%) | 530 | 540 | 535 |

TABLE 4

| | Properties (in relative units) | |
| --- | --- | --- |
| | P-1 | P-3 |
| Rolling resistance: | 100 | 101 |
| Wear resistance: | 100 | 100 |
| Drift thrust: | 100 | 100 |
| Braking on dry ground: | 100 | 100 |
| Braking on damp ground: | 100 | 106 |
| Performance on damp circuit comprising bends: | | |
| lap time: | 100 | 101.5 |
| behaviour mark: | 100 | 110 |

(a value greater than 100 indicates a performance which is improved compared with the control - base 100)

The invention claimed is:

1. A tire having a tread incorporating an elastomeric composition reinforced with an inorganic filler, said composition comprising:
   (i) a diene elastomer;
   (ii) as reinforcing inorganic filler, more than 80 phr of a silica having the following features:

(a) a BET specific surface area of more than 70 and less than 130 m²/g;
(b) an average particle size, $d_w$, of between 30 and 300 nm;
(iii) a coupling agent; and
(iv) a vulcanization system comprising sulfur, a vulcanization accelerator and between 0.5 and 1.5 phr of zinc as vulcanization activator.

2. The tire according to claim 1, wherein the diene elastomer comprises at least 50 phr of a butadiene elastomer.

3. The tire according to claim 2, wherein the butadiene elastomer is selected from the group consisting of polybutadienes, styrene-butadiene copolymers and mixtures of these elastomers.

4. The tire according to claim 1, wherein the amount of silica is greater than 90 phr.

5. The tire according to claim 4, wherein the amount of silica is between 90 and 150 phr.

6. The tire according to claim 1, wherein the vulcanization accelerator is a sulfenamide accelerator and wherein the overall amount of sulfur and sulfenamide accelerator is between 1.25 and 2.75 phr.

7. The tire according to claim 6, wherein the overall amount of sulfur and sulfenamide accelerator is within a range from 1.5 to 2.5 phr.

8. The tire according to claim 1, wherein the vulcanization accelerator is a sulfenamide accelerator and the vulcanization system further comprises a guanidine derivative, and wherein the overall amount of sulfur, sulfenamide and guanidine derivative is within a range from 1.75 to 4.25 phr.

9. The tire according to claim 8, wherein the guanidine derivative is DPG (diphenylguanidine).

10. The tire according to claim 1, wherein zinc is supplied in the form of zinc oxide.

11. The tire according to claim 10, wherein zinc is supplied in the presence of a fatty acid.

12. The tire according to claim 11, wherein the fatty acid is stearic acid.

13. The tire according to claim 12, wherein the amount of stearic acid is of 0.5 to 3 phr.

14. The tire according to claim 1, wherein the quantity of zinc is within a range from 0.7 to 1.3 phr.

15. The tire according to claim 1, wherein the coupling agent is selected from the group consisting of polyfunctional silanes and polysiloxanes.

16. The tire according to claim 15, wherein the coupling agent is a polysulfurised alkoxysilane.

17. The tire according to claim 16, wherein the quantity of polysulfurised silane is less than 6 phr.

18. The tire according to claim 1, wherein the composition further comprises carbon black.

19. The tire according to claim 18, wherein the amount of carbon black is between 2 and 20 phr.

20. The tire according to claim 1, wherein the silica has the following features:
a BET surface area of between 70 and 130 m²/g;
a particle size $d_W$ of between 50 and 200 nm;
a disagglomeration rate α greater than $5 \times 10^{-3}$ μm⁻¹/min.

21. The tread according to claim 20, wherein the silica has the following features:
a BET surface area within a range from 100 to 125 m²/g;
a particle size $d_W$ within a range from 100 to 150 nm.

22. The tire according to claim 21, wherein the silica has the following feature:
a disagglomeration rate α greater than $1 \times 10^{-2}$ μm⁻¹/min.

* * * * *